E. H. WINGQVIST.
BEVEL GEAR WHEEL.
APPLICATION FILED JULY 17, 1917. RENEWED APR. 2, 1919.

1,332,151.

Patented Feb. 24, 1920.
3 SHEETS—SHEET 1.

WITNESSES:

INVENTOR
Erik Hjalmar Wingqvist
By Attorneys,

E. H. WINGQVIST.
BEVEL GEAR WHEEL.
APPLICATION FILED JULY 17, 1917. RENEWED APR. 2, 1919.

1,332,151.

Patented Feb. 24, 1920.
3 SHEETS—SHEET 2.

WITNESSES:

INVENTOR:
Erik Hjalmar Wingqvist
By Attorneys,

E. H. WINGQVIST.
BEVEL GEAR WHEEL.
APPLICATION FILED JULY 17, 1917. RENEWED APR. 2, 1919.

1,332,151.
Patented Feb. 24, 1920.
3 SHEETS—SHEET 3.

WITNESSES:

INVENTOR
Erik Hjalmar Wingqvist
By Attorneys,

UNITED STATES PATENT OFFICE.

ERIK HJALMAR WINGQVIST, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BEVEL GEAR-WHEEL.

1,332,151.  Specification of Letters Patent.  Patented Feb. 24, 1920.

Application filed July 17, 1917, Serial No. 181,129. Renewed April 2, 1919. Serial No. 287,074.

*To all whom it may concern:*

Be it known that I, ERIK HJALMAR WING-QVIST, a subject of the King of Sweden, residing at Gottenborg, in the Kingdom of Sweden, have invented certain new and useful Improvements in Bevel Gear-Wheels, of which the following is a specification.

This invention relates to bevel gear wheels having curved skew teeth, an object of the invention being to provide a bevel gear wheel having the teeth and the spaces between the teeth (measured in the pitch cone) each of uniform width in all sections at right angles to the side surface of the teeth. In the preferred form of the invention, the side surfaces of the teeth are so formed that the lines of intersection between such side surfaces and the pitch cone, if developed in a plane, form involutes of a circle having its center at the apex of the pitch cone.

The ordinary bevel wheels of this kind are those having so-called "spiral teeth," in which the lines of intersection between the side surfaces of the teeth and the pitch cone form curves which, if extended, pass through the apex of the pitch cone. Such a bevel wheel may be considered as generated by rolling a cone on a plane generating wheel in which the lines of intersection between the generating teeth and the pitch cone form circular arcs passing, if extended, through the center of the pitch plane. It is obvious that, in a gear wheel generated in such manner, the side surfaces of the teeth and also the lines confining the bottom surfaces of the tooth spaces converge toward the apex of the pitch cone of the wheel. As a consequence, the cross-section of the tooth increases, as in ordinary bevel wheels having radial teeth, in proportion to the square of the distance of the section from the apex of the pitch cone. In such case each gap must be formed in two separate working operations by two different tools. The said gear wheels offer, however, among other things, the advantage that they can be generated, for a certain pitch (or module), by a common generating wheel, *i. e.*, all gear wheels generated by rolling on one and the same generating wheel have such a form of tooth and space as to be able to coöperate with each other.

In order to simplify the manufacture of such gear wheels, it has been proposed to make either the gaps or the teeth of the same width throughout, while maintaining the circular form of the above-named section of the teeth of the generating wheel.

In the former case, each gap or tooth space is cut in a single working operation by one and the same tool which is caused to swing about a fixed point. It is obvious, however, that the relative enlargement of the space toward the apex of the pitch cone entails a corresponding weakening of the cross-section of the tooth in the same direction. Moreover, the serious objection arises that two gear wheels manufactured in such manner cannot coöperate with each other, inasmuch as a tooth having a decreasing cross-section cannot work in a space of uniform width.

In the latter case, the whole tooth profile is cut by a tool which is likewise adapted to swing about a fixed point. It is true that in such manner a tooth of uniform width will be obtained, but, inasmuch as in this case the width of the space will decrease correspondingly toward the apex of the pitch cone of the wheel, it is also easily seen that two gear wheels manufactured in such manner cannot coöperate with each other.

On the other hand, a gear wheel manufactured in the first-mentioned manner can, under certain conditions, coöperate with a gear wheel manufactured in the last-mentioned manner. This necessitates, however, that in making a pair of gear wheels, or a gear, two separate methods of manufacturing and two different tools must be employed, and, moreover, the serious objection arises that the power of resistance of the gear will be limited to the power of resistance of the wheel of the pair having, as hereinbefore set forth, the considerably weakened teeth. So far as strength is concerned, nothing is gained in thus making the teeth of one wheel of the pair of uniform width, the net result being a weakening of the gear.

According to my present invention, all the aforesaid disadvantages, either of the normal spiral gear wheels or of the abnormal ones, are avoided by a construction wherein the lines of intersection between the side surfaces of the teeth and the pitch cone, when developed in a plane, are formed as involutes of a circle having its center at the apex of the pitch cone. By this formation, the teeth and the spaces will be of uniform width throughout, (measured in the pitch cone) i. e., at the same time as a tooth of uniform width throughout is obtained, a whole tooth space can be formed in a single working operation by a single tool. Moreover, by one and the same generating wheel, i. e., by the same tool and in the same manner, different series of gear wheels of the same module can be generated, all of which are capable of coöperation with one another.

In the accompanying drawings some constructions of the invention are shown.

Figure 1:
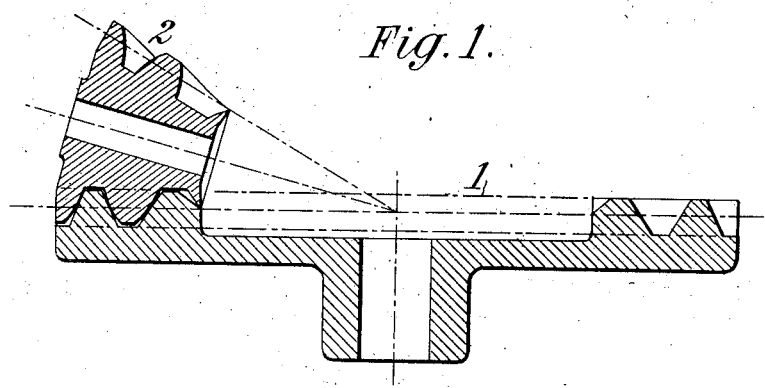
Figure 1 is a section of a generating wheel and a bevel gear wheel according to the invention during the generating process.
Figure 2:
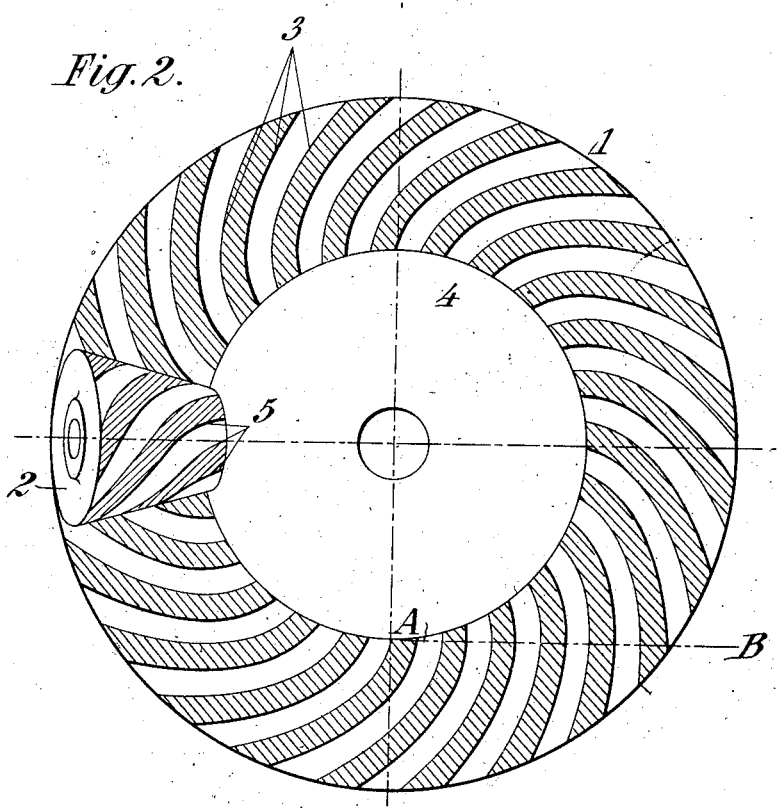
Fig. 2 is a plan of the wheels of Fig. 1, the generating wheel and the wheel generated being, for the sake of simplicity, represented on sections through their pitch cones, respectively.
Figure 3:
Fig. 3 is a section of the generating wheel, the plane of section being indicated by the line A—B of Fig. 2.

In Figs. 1 and 2, 1 designates the plane generating wheel and 2 the bevel wheel generated by rolling thereon. In this illustration, the teeth of the generating wheel are shown of uniform height throughout and of straight profile, i. e., they each have, in cross-section, the form of a truncated wedge having straight sides, as clearly shown in Fig. 3. In Fig. 2, 3 designates the lines of intersection between the pitch plane of the generating wheel and the generating teeth. In the form of embodiment shown, said lines of intersection are formed as involutes of the circle 4, the plane of the section of Fig. 3 being on the line A—B and tangential to such circle. The perpendicular distance between two successive involutes being known to be always constant and equal to the pitch at the base circle 4, it follows that both the tooth and the gap or tooth space will be of uniform width wherever they be cut by planes at right angles to the involutes. The teeth of the generating wheel are of uniform height and width, and the spaces are also of uniform width. It is, however, to be observed that, if a tooth be cut by a series of cylinders placed concentrically around the axis of the generating wheel, the cross-section increases, as usual, as the distance of the section from the center of the pitch plane increases. Obviously, this is also the case as regards the gap.

From the foregoing it is apparent that, if a bevel gear wheel be generated by rolling upon such a generating wheel, as is above described, the teeth and spaces of such generated wheel will also be of uniform width. This is illustrated in Fig. 2, where the involutes 3 of the generating wheel are shown wound on the pitch cone of the wheel 2. The lines 5 here represent, (corresponding to the involutes 3 of the generating wheel), the lines of intersection between the side surfaces of the teeth and the pitch cone. It is evident that the distance between two successive lines 5 (measured in the pitch cone) is always constant and equal to the corresponding distance between the involutes 3. From this it follows that the teeth and the spaces must be of uniform width also in the generated wheel 2. In other words, the teeth of the wheel 2 will obtain a form corresponding to the teeth of the generating wheel, i. e., they will be of uniform width and uniform height, whereas the tooth profile will not be straight, but curved. If, on the other hand, a tooth be cut by parallel planes at right angles to a generating line of the pitch cone, the cross-section of the tooth will increase, just as in the generating wheel, according as the distance of the section from the apex of the pitch cone increases.

The carrying into practice of this rolling generation can be performed by a cutting tool having a profile corresponding to the tooth profile of the generating wheel, i. e., having in profile the form of a truncated wedge with straight sides, said tool, while being caused to perform a cutting movement in the direction of an involute of the generating wheel, being caused to simultaneously describe such a rolling movement relatively to the gear wheel blank as would be described by a tooth of the generating wheel meshing with the gear wheel to be generated.

Figure 4:
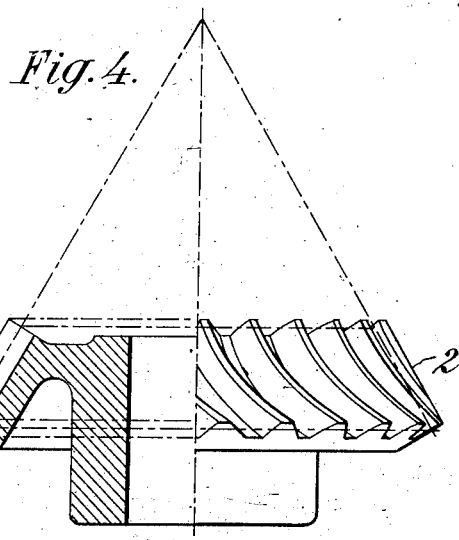
Fig. 4 is a view, partly in elevation and partly in section, of a bevel gear wheel made according to my invention.
Figure 5:
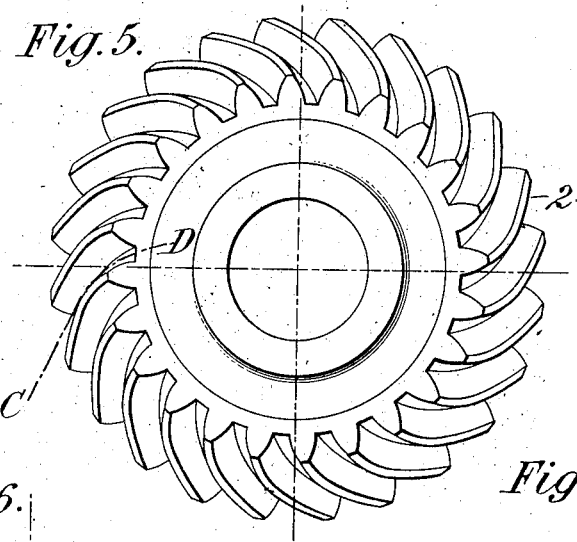
Fig. 5 is a plan view of the gear wheel represented in Fig. 4, the plane of the section of Fig. 4 being indicated in Fig. 5 by the line C—D.
Figure 6:
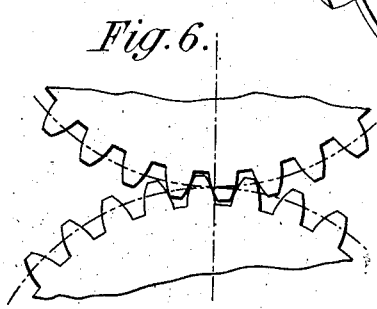
Figs. 6 and 7 show schematically some existing tooth forms.

A bevel wheel generated in that manner is shown in Figs. 4 and 5. It appears that each tooth is of uniform height from end to end, and the bottom and top surfaces are parallel to the pitch cone. In order to obtain the desired uniform width of the tooth and space, it is evidently necessary to cause the wedge-shaped cutting tool to cut into the wheel blank to the same extent at both ends of the space, by which the tooth obtains the uniform height shown. Furthermore, on account of the tooth being of uniform width, as stated, the result will be a tooth of uniform strength along its whole length. The tooth profile will be curved and of the form shown in Fig. 6.

A gear wheel of the kind described can also be manufactured by hot rolling in such manner that the red hot gear wheel blank is caused to roll, under pressure, against the generating wheel.

Figure 7:
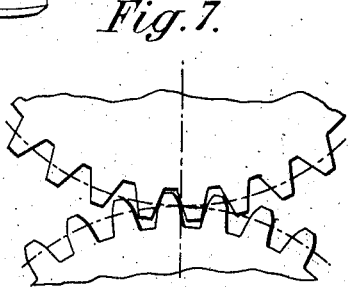

Obviously, the teeth of the one wheel of a pair of wheels can be made with a straight profile, as shown in Fig. 7. This entails the simplification of manufacture, as regards one wheel of the pair, that the wedge-shaped tool has only to perform the cutting movement hereinbefore set forth, but no rolling movement relatively to the wheel blank. On the other hand, the second wheel of the pair must be generated by rolling on the first-mentioned wheel, i. e., either by hot rolling or by means of a wedge-shaped cutting tool having the same profile as the teeth of the latter wheel, said tool having to perform in such case both a cutting and a rolling movement. It is, however, obvious, that the co-operation of the teeth will be theoretically correct, whether both wheels be generated by a common generating wheel, in which case they will both obtain a curved tooth profile, or one wheel be made with straight tooth profile and employed in generating the second wheel of the pair.

Figure 8:
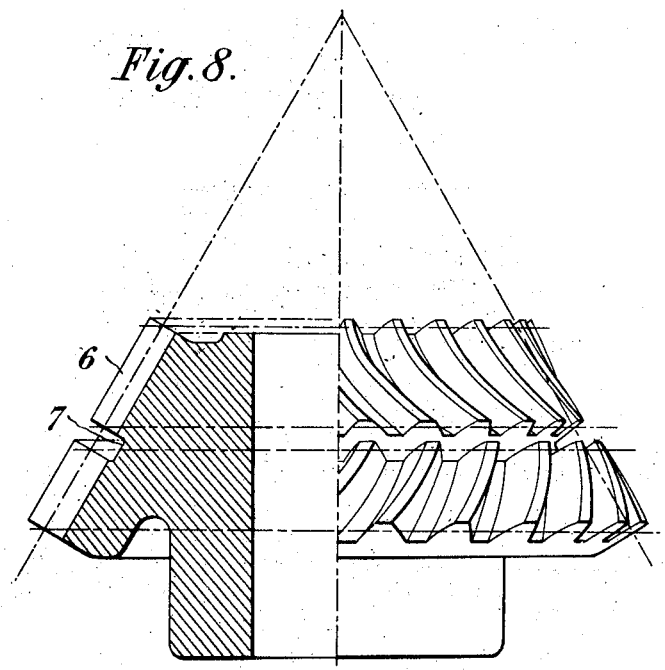
Fig. 8 is a view, partly in elevation and partly in section, of a form of so-called "V-toothed bevel gear wheel" made according to my invention.
Figure 9:
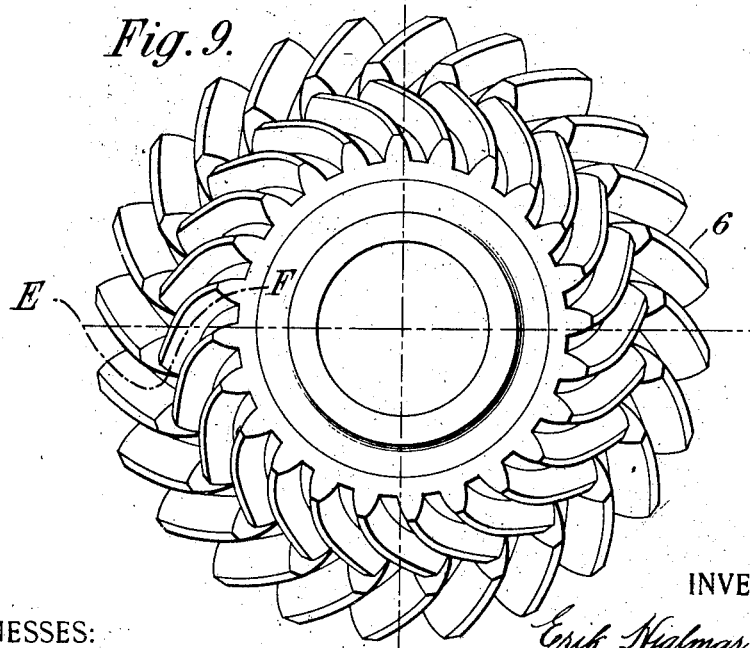
Fig. 9 is a plan view of the wheel shown in Fig. 8, the plane of section of Fig. 8 being indicated in this view by the line E—F.

Figs. 8 and 9 show a so-called "V-toothed bevel gear wheel" having teeth according to the invention. In this case, the teeth of the two sections of the wheel form an angle with each other, in a known manner. In order to be able to cut the inner parts of the spaces, the wheel blank 6' has an annular slot 7 in which the cutting tools working from opposite ends have sufficient play to move without interfering with the opposite section. Obviously, also this gear wheel can be made with a straight tooth profile or with a curved one. Instead of making use of the slot 7, peripherally arranged holes may be provided, the number of which corresponds to that of the tooth spaces; by this means the teeth of the two wheel sections are uninterrupted at their inner ends and are consequently stronger.

The described method of making the gear wheels herein set forth is not claimed in this application, being made the subject of an application filed March 14, 1918, Serial No. 222,385.

It is to be understood that the gear wheels herein shown are illustrative of my invention and that changes may be made within the scope of the claims, without departing from the spirit of the invention.

What I claim is:—

1. A bevel gear wheel having the teeth and tooth spaces (measured in the pitch cone) each of uniform width in all sections at right angles to the side surface of the tooth.

2. A bevel gear wheel having the side surfaces of its teeth so formed that the lines of intersection between such side surfaces and the pitch cone, when developed in a plane, form involutes of a circle having its center at the apex of the pitch cone.

3. A bevel gear wheel according to claim 1, having the teeth of uniform height, the cross-section of each tooth being constant throughout its length.

4. A bevel gear wheel according to claim 1, having the teeth of the form which would be obtained by the rolling of a cone on a generating wheel, the teeth of which form, in cross-section, a truncated wedge having straight sides, and in which the lines of intersection between the generating teeth and the pitch cone, if developed in a plane, form involutes of a circle having its center at the apex of the pitch cone.

5. A bevel gear wheel according to claim 1, having the teeth of the form which would be obtained by the rolling of a cone on a generating wheel, having teeth the lines of which intersecting the pitch plane, form involutes of a circle the center of which coincides with the center of said wheel and the apex of the pitch cone of such bevel gear.

In witness whereof I have hereunto signed my name.

ERIK HJALMAR WINGQVIST.